United States Patent [19]

Mottla

[11] Patent Number: 4,457,504

[45] Date of Patent: Jul. 3, 1984

[54] COLLAPSIBLE/KNOCKDOWN SAWBUCK

[76] Inventor: Gilbert E. Mottla, 173 Mill La., Amherst, Mass. 01002

[21] Appl. No.: 410,322

[22] Filed: Aug. 23, 1982

[51] Int. Cl.³ .............................................. B23Q 3/00
[52] U.S. Cl. ................................... 269/296; 269/901; 182/153; 182/181
[58] Field of Search ...................... 182/152, 153, 181; 108/111, 153, 115, 124, 121, 128; 269/901, 296, 307, 900

[56] References Cited

U.S. PATENT DOCUMENTS

| Re. 28,244 | 11/1974 | Evans | 108/111 |
|---|---|---|---|
| 1,563,535 | 12/1925 | Sondack | 108/124 |
| 3,944,203 | 3/1976 | Brekelbaum | 269/900 |
| 4,157,174 | 6/1979 | Hickman et al. | 269/901 |
| 4,199,135 | 4/1980 | Wohrle et al. | 269/901 |
| 4,343,245 | 8/1982 | Edwards | 108/111 |
| 4,362,295 | 12/1982 | Ford | 269/901 |

FOREIGN PATENT DOCUMENTS 946518  6/1949  France ................................ 108/121

*Primary Examiner*—Robert C. Watson
*Attorney, Agent, or Firm*—Fishman & Dionne

[57] ABSTRACT

A sawbuck which is collapsible/knockdown to form a unified flattened bundle for easy storage or transport in which part of the sawbuck collapses to form a storage pocket for receiving the remaining part of the sawbuck.

5 Claims, 4 Drawing Figures

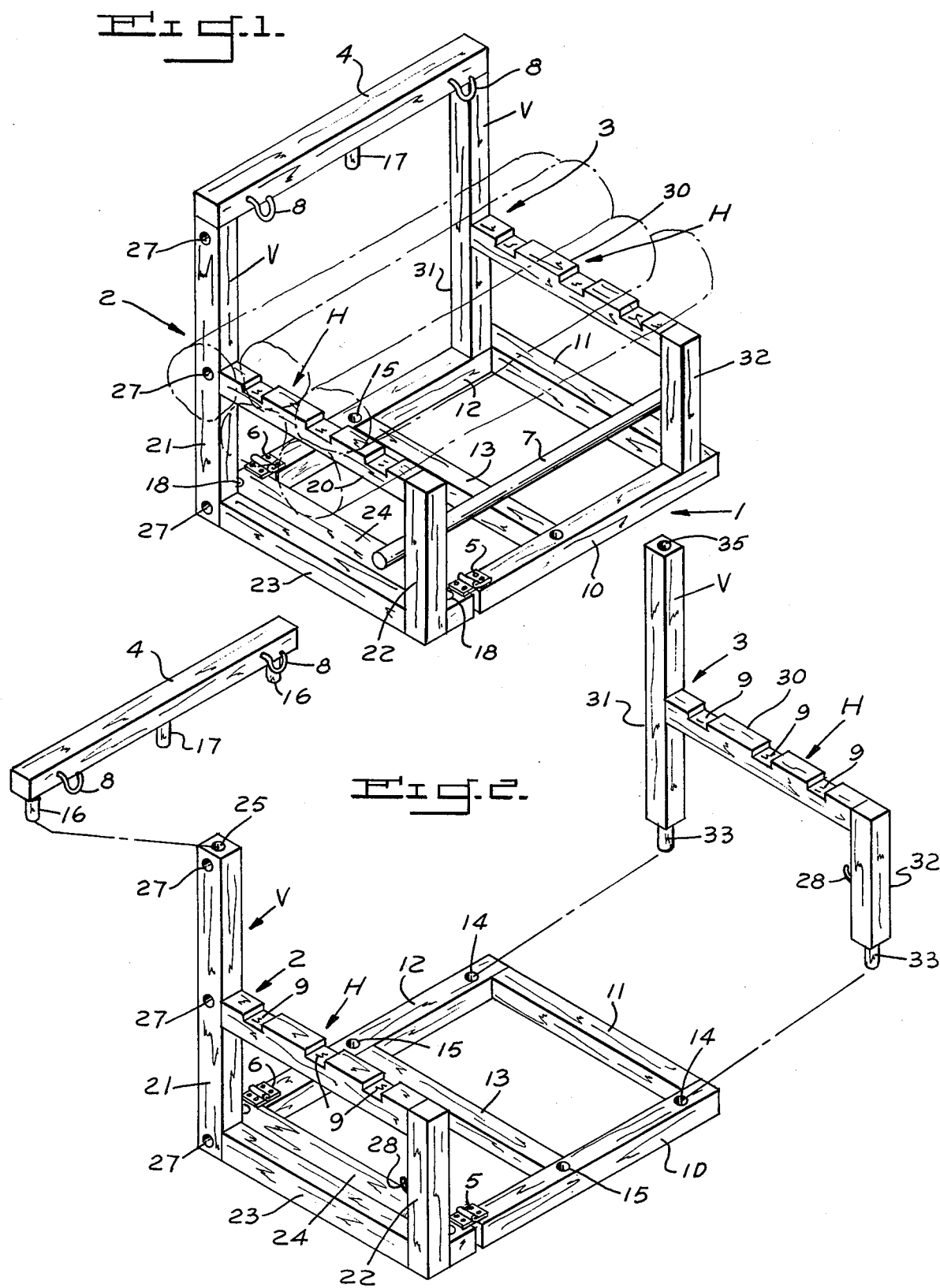

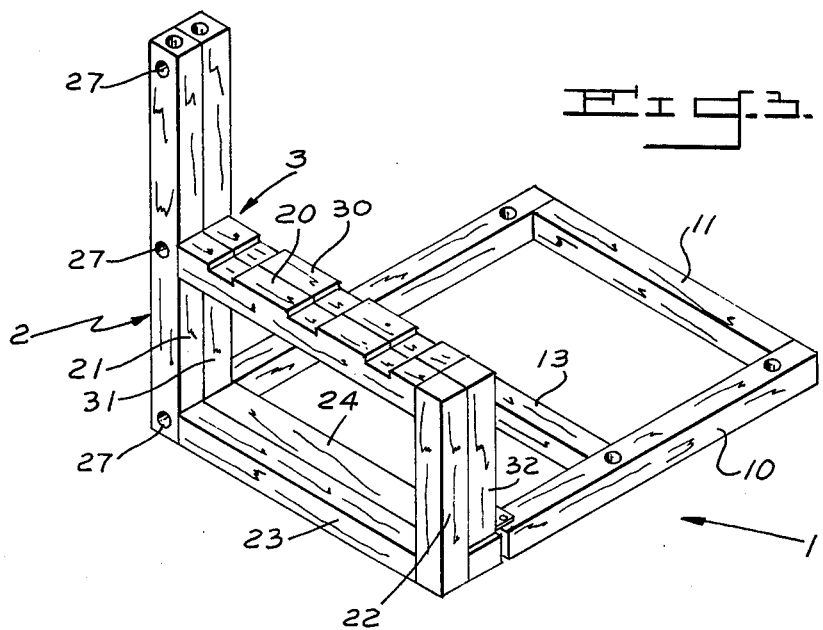
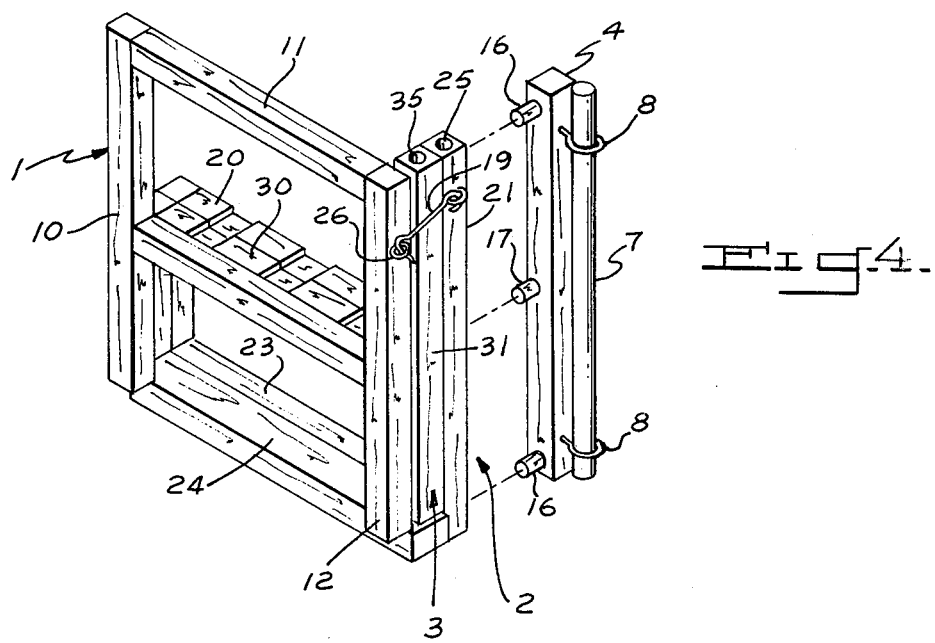

COLLAPSIBLE/KNOCKDOWN SAWBUCK

BACKGROUND OF THE INVENTION

This invention relates to a collapsible/knockdown sawbuck for use with a chainsaw. The rediscovery of the fireplace and woodstove has created a great demand for wood which, in turn, has caused many people to become involved in cutting their own firewood. While some have utilized conventional hand saws and axes for this purpose, many have found the chain saw to be most expedient. The chain saw allows logs to be cut easily and quickly. However, finding a suitable sawbuck to support the logs while cutting and also for easy collapsing for storage and transport has created a problem.

Conventional sawbucks, those for use with a hand saw, are designed for holding one log at a time, in a firm manner to resist the push-pull stresses of the saw. Thus, for the most part, you have a sawbuck which provides two V-shaped log supporting notches in which the log to be cut is placed, cut with the saw, removed, and then another log is placed. This repetitive placing and removal for each log is fine for hand saw work but becomes tiresome and time-consuming when a chain saw is used. Sawbucks of this type can be see in U.S. Pat. Nos. 2,733,740 and 2,652,079.

The chain saw allows the cut to be made very quickly, so it would be useful to support a plurality of logs at one time to be cut, without the necessity of positioning of a log between each cut. This invention provides a sawbuck which accepts a plurality of logs and supports them safely for cutting with a chain saw.

The sawbuck of this invention also provides a sawbuck which is easily collapsed and knocked down to form a smaller bundle appropriate for storage and transport.

BRIEF SUMMARY OF THE INVENTION

The sawbuck of this invention provides two work supports, similarly situated and spaced from one another to support a plurality of logs for safe cutting. The work supports provide vertical rails which allow the logs to be stacked and prevent the logs from moving off the horizontal rails, also provided by the work supports, as they are cut with the chain saw.

The logs can be further stabilized by providing recesses or cutouts in the horizontal rails to prevent the logs from rolling or sliding along the surface.

A further convenience is the collapsible nature of this sawbuck.

The sawbuck includes the two work supports and a base which maintains the two work supports in their operative positions. A tie rail joining the upper ends of the work supports may be added to further stabilize the sawbuck. One of the work supports is permanently joined to the base with a pivotal connection so that the base and work support may be folded from their operative position to a storage position forming a slot or pocket therebetween adapted to receive the other work support which is detachable from the base. The tie rail can also be detached from the two work supports and joined to the folded base and work support for storage.

Thus, the sawbuck can be knocked down and collapsed into a small, flattened, unified bundle for easy storage and transport.

The detachable feature also allows the spacing between the two work supports to be varied.

An index bar can also be provided to quickly gauge the length to which the logs are to be cut.

BRIEF DESCRIPTION OF THE DRAWING FIGURES

FIG. 1 is a perspective view of the erected sawbuck;
FIG. 2 is a perspective view of the sawbuck with the detachable tie rail and one work support detached from the construction;
FIG. 3 is a perspective view of the sawbuck showing the detachable work support in storage position; and
FIG. 4 is a perspective view of the sawbuck in storage condition with the tie rail separated from the folded base and work support.

DETAILED DESCRIPTION OF THE INVENTION

The sawbuck, as shown in FIG. 1, comprises two work supports (indicated generally by the reference characters 2 and 3) connected at their lower ends by a base 1 and at their upper ends by a tie rail 4. The two work supports 2,3 each include a horizontal rail H and a portion V of the vertical element 21, which define two L-shaped log supports. The two work supports are similarly disposed and spaced to provide proper elevated support for a plurality of logs so they may be safely cut with a chain saw to appropriate lengths.

The portions V act as a stop to prevent movement of the logs off the horizontal rails H as the cuts are made.

The base comprises two parallel elements 10,12 each joined at one end and generally at their respective midpoints by a side element 11 and element 13, respectively. These elements which make up the frames may be wood, plastic or any suitable material.

The ends of the parallel elements 10,12 opposite the side element 11 are pivotally connected via hinges 5,6, respectively, to one work support 2. The pivotal connection enables the base frame 1 to be folded from its operative position, FIG. 1, to its storage position, FIG. 4. Thus, a slot or storage pocket is formed to receive the other work support 3 therebetween, as seen in FIG. 4.

The work supports 2,3 include the horizontal elements 20,30 defining the horizontal rails H. These horizontal elements 20,30 are supported at their ends by vertical elements 21, 22, 31, 32. At one end of each horizontal element 20,30, the vertical elements 21,31 extend above the horizontal rail H to define the vertical portion V.

The work support 2 to which the base is pivotally joined has two lower horizontal elements 23,24, one of which elements 23 joins the two lower ends of the vertical elements 21,22, the other of which elements 24 joings the work support 2 to the base 1 via hinges 5,6.

The other work support 3 has a peg 33 projecting from the lower end of each of the vertical elements 31,32 which are inserted into sockets 14 of the base 1 so that this work support 3 may be easily anchored to the base 1. Sockets 15 are also provided in the base 1 so that the spacing between the two work supports 2,3 may be shortened.

The element 24 of the pivotally joined work support is dimensioned such that the storage pocket, which is formed when the base 1 and work support 2 are folded in storage position, is wide enough for the other work support 3 to snugly fit therebetween. The sockets 18 (shown partially hidden in FIG. 1) on the upper surface of the element 24 also accept the pegs 33 projecting downwardly from the lower ends of the vertical elements 31,32 of the work support 3 when it is in the storage position. The element 24 is dimensioned vertically and (at) the length of the base and two work supports are chosen such that they are flush at their upper ends when in storage position (see FIG. 4).

The upper surfaces of the vertical elements 21,31 of the work supports 2,3 also have sockets 25,35 into which pegs 16 of tie rail 4 are inserted when the detachable work support 3 is mounted in the sockets 14 of the base 1 and the work supports 2,3 are widely spaced. Peg 17, generally at the midpoint of the tie rail 4 is designed to be inserted into the socket 35 of the detachable work support 3 when same is positioned in sockets 15 of the base, closer to the other work support 2. Thus, the tie rail 4 stabilizes the work supports 2,3 by detachably fastening together the upper ends of the vertical elements 21,31 in either operable position of the detachable work support 3.

The horizontal elements 20,30, forming the horizontal rails H, have spaced recesses 9 on their top surfaces to stabilize any logs resting thereon. These recesses 9 prevent rolling or sliding of the logs along the horizontal rails H.

The pivotal connection between the base 1 and one work support 2, as well as the detachable fastening of the other work support 3 and the tie rail, are provided so as to enable the sawbuck to be stored and transported in a unified collapsed condition, as shown in FIG. 4. The detachable work support 3 is attached to the other work support 2 by inserting the lower pegs 33 into sockets 18 provided in the lower horizontal elements 24 of the work support 2, as shown in FIG. 3. The base 1 is pivoted to storage/transport position so that the two work supports 23, and the base 1 all are closely adjacently parallel as shown in FIG. 4. Fastening means such as an eye 26 and hook 19 are provided on the base 1 and the pivotally connected support 2 to maintain their folded storage/transport position.

The pivotally connected work support 2 also have three sockets 27 provided in its vertical element 4, on the outboard side (see FIGS. 1 and 2) into which the pegs 16,17 of the tie rail 4 may be inserted for storage/transport purpose (see FIG. 4).

The sawbuck also includes an index bar 7 for indexing the proper length to which the logs are to be cut. The tw vertical elements 22,32 of the work supports 2,3 each have, projecting inwardly, a hook 28, best seen in FIG. 4, similar to the hooks 8 located on the tie rail 4. These hooks 28 are dimensioned such that the index bar 7 may be held in position as shown in FIG. 1 so the log lengths are easily compared to the index bar 7. The hooks 8 on the tie rail 4 are provided for storage of the index bar 7 as shown in FIG. 4.

Thus, the sawbuck may be easily knocked down and collapsed from its erected operative condition as shown in FIG. 1 to a storage or transport condition as shown in FIG. 4. The storage condition of the sawbuck provides a unified bundle, in which the base and the pivotally connected work support form a storage pocket for the detachable work support and the tie rail and are attached thereto so as to save space during storage and for each transport of the sawbuck.

Having thus described the invention, what is claimed is:

1. A collapsible/knockdown sawbuck for positioning and sawing wood comprising in combination:
   (a) a base;
   (b) a first work support having an L-shape;
   (c) pivot means for permanently connecting said first work support to said base whereby said base and said first work support are collapsible from an operative position, with said first work support extending upwardly, perpendicular to said base, to a storage position, with said base in spaced parallelism with said first work support to define a storage space therebetween;
   (d) a second work support having an L-shape;
   (e) anchor means for detachably connecting said second work support in operative position to said base with the second work support spaced from and parallel to said first work support, and said second work support being received in said storage space when said base and first work support are collapsed to said storage position.

2. A sawbuck as claimed in claim 1 wherein said base has a surface upwardly facing when said base is in operative position and said anchor means comprises pegs integral with and projecting downwardly from said second work support and sockets disposed in the upper surface of said base to slidingly accept said pegs.

3. A sawbuck as claimed in claim 2 wherein said upper surface of said base has further sockets to detachably connect said second work support to said base in an alternate operative position whereby said second work support is spaced from and parallel to said first work support at a closer spacing than in said operative position.

4. A sawbuck as claimed in any one of claims 1, 2 or 3 including:
   (a) a tie rail; and
   (b) further anchor means for detachably connecting said tie rail in operative position to said first and second work supports with said tie rail spaced from and parallel to said base.

5. A sawbuck as claimed in claim 4 wherein said first and second work supports each have a surface upwardly facing when in operative position and said further anchor means comprises pegs integral with and projecting downwardly from said tie rail and a socket disposed in each upper surface of the respective said first and second work support to slidingly accept one of said pegs.

* * * * *